United States Patent [19]
Janiszewski

[11] Patent Number: 5,626,213
[45] Date of Patent: May 6, 1997

[54] ENGAGING DEVICE IN A VEHICLE GEAR BOX

[75] Inventor: Grzegorz Janiszewski, Angered, Sweden

[73] Assignee: AB Volvo, Gothenburg, Sweden

[21] Appl. No.: 522,334

[22] PCT Filed: Mar. 16, 1994

[86] PCT No.: PCT/SE94/00231

§ 371 Date: Sep. 13, 1995

§ 102(e) Date: Sep. 13, 1995

[87] PCT Pub. No.: WO94/21935

PCT Pub. Date: Sep. 29, 1994

[30] Foreign Application Priority Data

Mar. 19, 1993 [SE] Sweden .................... 9300913

[51] Int. Cl.⁶ .................... F16D 23/02; F16D 11/06
[52] U.S. Cl. .................... 192/53.4; 192/53.34; 192/108; 192/114 T; 74/339
[58] Field of Search .................... 192/48.5, 48.91, 192/53.34, 53.341, 53.342, 53.343, 69.9, 108, 114 T; 74/339, 409

[56] References Cited

U.S. PATENT DOCUMENTS

| | | |
|---|---|---|
| 1,935,965 | 11/1933 | Wahlberg . |
| 3,303,915 | 2/1967 | Oesterle .................... 192/53.34 X |
| 3,334,715 | 8/1967 | Bibbens . |
| 3,620,338 | 11/1971 | Tomita et al. .................... 192/53.343 |
| 3,779,352 | 12/1973 | Worner .................... 192/108 X |
| 3,861,509 | 1/1975 | Inoue et al. .................... 192/53.343 |
| 4,727,968 | 3/1988 | Chana . |
| 4,848,548 | 7/1989 | Diehl . |

*Primary Examiner*—Richard M. Lorence
*Attorney, Agent, or Firm*—Young & Thompson

[57] ABSTRACT

Engaging device in a motor vehicle gearbox, having an engaging sleeve (8) with a toothed rim with internal engaging teeth (11) and a toothed rim (4) joined to a gear (2, 3) and having external teeth (5). The engaging teeth of the engaging sleeve have first flank surface portions (23) adjacent to pointed end portions (22) and second flank surface portions (26) connected via a step (25) thereto. The flank surface portions (23, 26) are inclined inwards, as seen from the end of the tooth, towards the longitudinal axis (24) of the tooth, the first surface portions (23) having a greater incline than the second surface portions (26).

4 Claims, 2 Drawing Sheets

ENGAGING DEVICE IN A VEHICLE GEAR BOX

FIELD OF THE INVENTION

The present invention relates to an engaging device for a gear freely rotatably mounted on a shaft in a transmission, for locking the gear to the shaft or releasing the gear from the shaft, comprising an engaging sleeve mounted non-rotatable but axially displaceable relative to the shaft, and provided with engaging teeth, and a toothed rim joined to the gear and provided with corresponding engaging teeth, the engaging teeth having pointed end portions and opposite flanks connected thereto, each of the flanks being provided with a step spaced from the end portion, so as to form first surface portions inclined from the pointed end portion towards the step, on the engaging teeth of the engaging sleeve and of the gear.

BACKGROUND OF THE INVENTION

Engaging devices of this type are generally used in modern motor vehicle gearboxes. The inwardly inclined surface portions of the tooth flanks are designed to increase the engaging force of the engaging sleeves, i.e. prevent an engaged gear from "popping out" due to the engaging sleeve being displaced from its engaged position under high torque load and during power shifting. The inwardly inclined surface of the tooth flank causes the force acting on the flank in the rotational direction to have a force component acting in the engagement direction of the engaging sleeve, the magnitude of the force component depending on the angle of the inclined surface portion relative to the rest of the flank surface.

One result of the engaging teeth of the engaging sleeve and the free gear being provided with tooth flanks, the outer end portions of which are inclined inwards, is that there must be, depending on the angle of incline, a certain amount of play between the engaging teeth of the engaging sleeve and the free gear. This play causers backlash in the gearbox and in modern gearboxes this backlash amounts to about 50% of the total backlash in the gearbox.

In general, the smaller the play is between the teeth of the engaging sleeve and the free gear, the smaller the risk will be for gear disengagement during power shifting. In modern serial production of gearboxes most units would function without any risk of disengagement even with a very small angle of inclination (between 1° and 2°) and consequently with very, little play, but it is unavoidable that for a small number of gear-boxes the variations within the tolerances will be such that there will be a large backlash in the gearbox despite the small angle of inclination of the flank portion, giving rise to the risk of gear disengagement. In order to achieve full security by unfavourable variation within tolerances in new gearboxes and in gearboxes with backlash caused by wear, the teeth of the engaging sleeve and the free gear are therefore made with surface portions, the angle of inclination of which is between 3° and 4°. However, the consequence of this is that the backlash in most gearboxes will be greater than what it actually needs to be.

SUMMARY OF THE INVENTION

The purpose of the present invention is to provide an engaging device of the type described by way of introduction, which combines the two apparently non-compatible properties of small backlash and great security against gear pop-out.

This is achieved according to the invention by virtue of the fact that the tooth flanks of the engaging sleeve are provided with a second step spaced from the first step so that second surface portions are formed which are inclined from the first step towards the second step and which have a smaller angle of inclination relative to a plane parallel to the adjacent flank surfaces inside the second step than the first surface portions.

The second surface portion can have an angle of inclination of between 1° and 3°, which provides adequate security against gear disengagement in most cases. The angle of inclination of this surface portion determines the required play, which will be small. The first surface portion can have an angle of inclination of between 3° and 4°, which provides full security in the above described unfortunate cases, since the engaging sleeve, when it is displaced due to insufficient engaging force towards the disengaging position, is caught and blocked by the interaction between its first surface portion inclined at a larger angle and the inclined surface portion of the engaging tooth of the free gear.

BRIEF DESCRIPTION OF THE DRAWING

The invention will be described in more detail below with reference to the examples shown in the accompanying drawings, where.

DETAILED DESCRIPTION OF THE INVENTION

Figure 1:
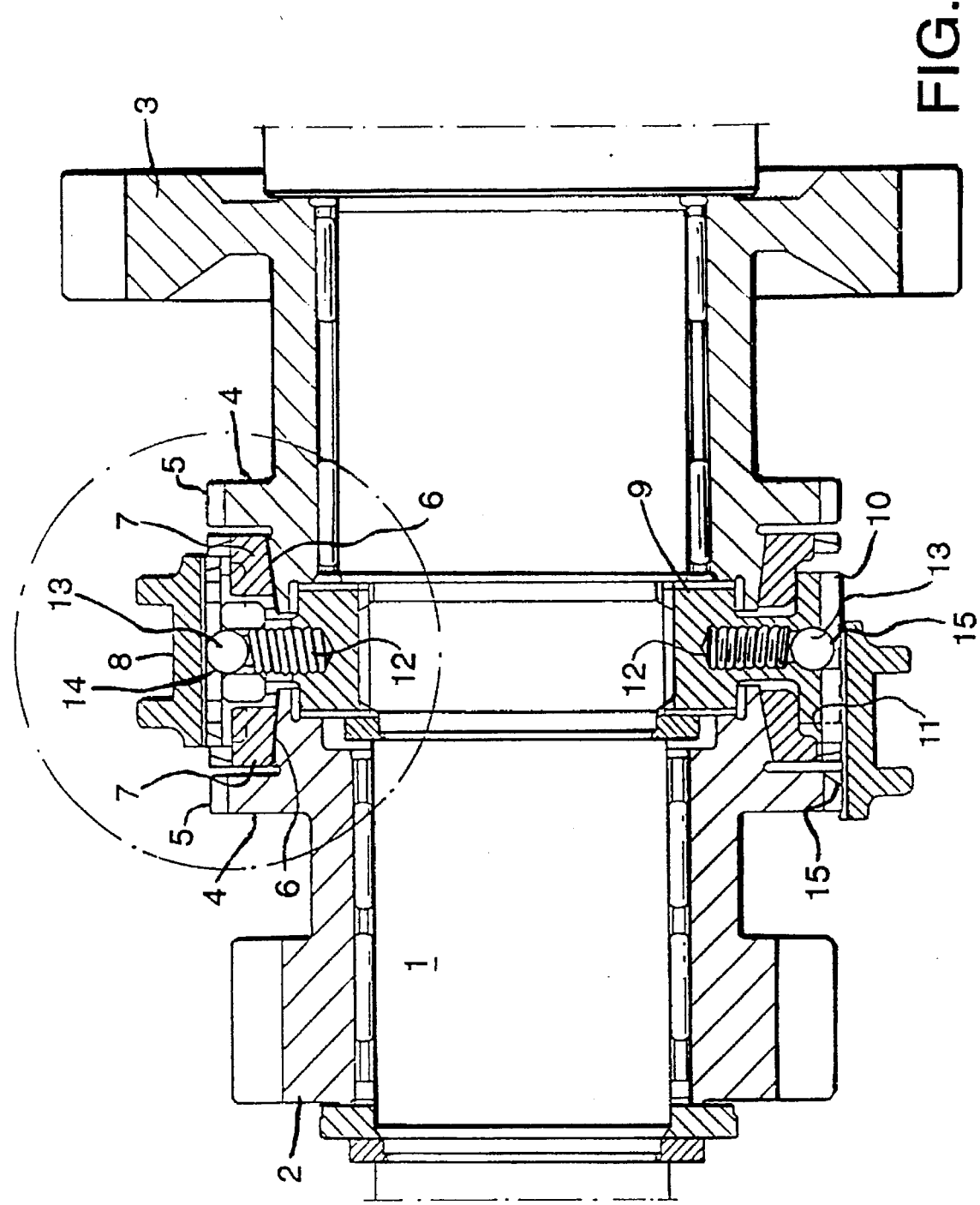
FIG. 1 shows a longitudinal section through one embodiment of an engaging device according to the invention in its disengagement position (upper half) and in an engaged position (lower half) and FIGS. 2 and 3 are enlarged plan views of the teeth of the engaging device in different engagement positions.

In FIG. 1, 1 designates a shaft in a vehicle gearbox (not shown in more detail here). A first gear 2 and a second gear 3 are rotatably mounted on the shaft. Each gear 2, 3 is made in one piece with a toothed rim 4, having engaging teeth 5, and a synchronizing cone 6, which cooperates with a synchronizing ring 7. An engaging sleeve 8 is, in a conventional manner, mounted to be non-rotatable but axially displaceable on an engaging hub 9, which is non-rotatably fixed to the shaft 1 and has external teeth 10 in engagement with internal teeth 11 on the engaging sleeve 8. The hub 9 is made with a plurality of evenly distributed radial bores, each of which contains a spring 12 and a ball 13. Certain engaging teeth 11 of the engaging sleeve 8 have a central depression 14 into which a ball 13 engages in the neutral position of the engaging sleeve 8 in order to centre the sleeve in a neutral position. Other teeth 11 of the engaging sleeve have a pair of depressions 15 at their ends, into which balls 13 engage in either engagement position and which are designed to load the engaging sleeve 8 towards the engagement position.

Figure 2:
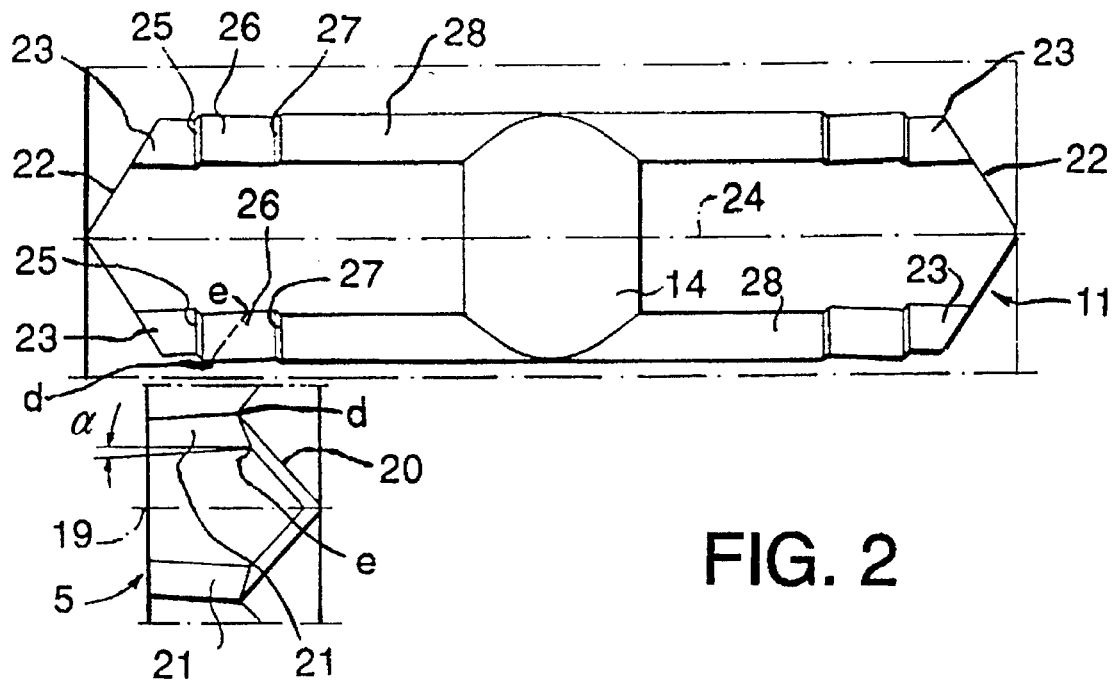
Figure 3:
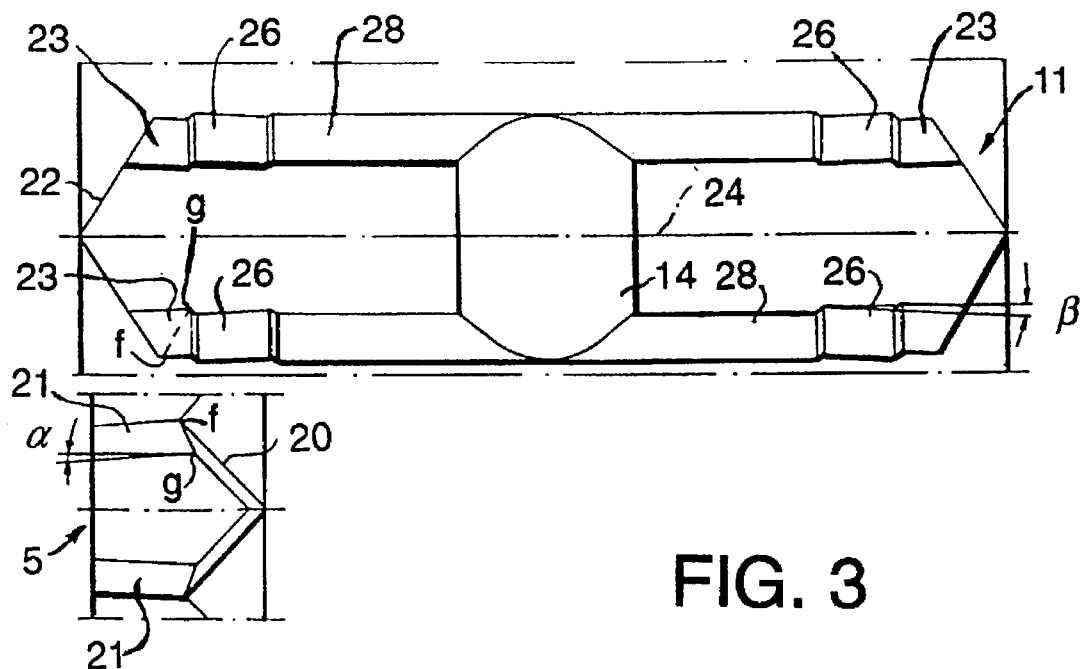

FIGS. 2 and 3 show in a larger scale an engaging tooth 5 of the toothed rim 4 of a gear 2, 3 and an engaging tooth 11 of the engaging sleeve 8. The engaging teeth 5 have a pointed end portion 20 and opposing flanks 21, which are inclined inwards towards the longitudinal axis 19 of the tooth at an angle α which can be between and 3° and 4°. The teeth 11 of the engaging sleeve 8 also have pointed end portions 22 and flank surface portions 23 adjacent to the end portion and having an inclination corresponding to the inclination of the flank 21, i.e. they form an angle of between 3° and 4° with the longitudinal axis 24 of the tooth. The teeth 11 of the engaging sleeve 8 have a step 25 between the surface portion 23 and an additional flank surface portion 26 which, via an additional step 27, is connected to tooth flanks 28, which are parallel to the longitudinal axis 24. The surface portion 26 has a smaller inclination than the surface portion 23. For example its angle of inclination β can be between 1° and 3°.

FIG. 2 shows the tooth side of the gear 2, 3 and the teeth 5 and 11, respectively, of the engaging sleeve 8 in normal engagement. The dashed line d–e indicates the line contact between the edge line d–e of the tooth 5 and the surface portion 26 of smaller inclination of the tooth 11. In this position a minimum of backlash is obtained. If the angle β should not be sufficient to keep the engaging sleeve in the engaged position in FIG. 2, for example due to unfortunate variation within tolerances in the gearbox, the teeth 5 and 11 will move apart to the position shown in FIG. 3 (see f–g), in which the larger angle α of the surfaces 21, 23 assures sufficient engaging force. During power shifting, the interaction between the spring-loaded balls 13 and the depressions 15 at the ends of the engaging teeth will move the engaging sleeve back to the engagement position d–e.

I claim:

1. In an engaging device for a gear freely rotatably mounted on a shaft in a transmission, for locking the gear to the shaft or releasing the gear from the shaft, comprising an engaging sleeve mounted non-rotatable but axially displaceable relative to the shaft, and provided with engaging teeth, and a tooth rim adapted to be joined to the gear and provided with corresponding engaging teeth, said engaging teeth of the sleeve having pointed end portions and opposite flanks connected thereto, each of said flanks being provided with a first step spaced from said end portion, so as to form first surface portions inclined from the pointed end portion towards the first step, on the engaging teeth of the engaging sleeve and of the gear, the improvement wherein the tooth flanks of the engaging sleeve are provided with a second step spaced from said first step so that second surface portions are formed which are inclined from the first step towards the second step and which have a smaller angle of inclination relative to a plane parallel to adjacent flank surfaces inside the second step than said first surface portions.

2. The engaging device according to claim 1, wherein the angle of inclination of the first surface portion relative to said plane is approximately twice the magnitude of the angle of inclination of the second surface portion.

3. The engaging device according to claim 2, wherein the angle of inclination of the first surface portion relative to said plane is between 3° and 4°, and the angle of inclination of the second surface portion is between 1° and 3°.

4. The engaging device according to claim 1, wherein the second surface portion has a larger extent in a longitudinal direction of the tooth than does the first surface portion.

* * * * *